US005518345A

United States Patent [19]

Obermeier

[11] Patent Number: 5,518,345

[45] Date of Patent: May 21, 1996

[54] TOOL BIT AND TOOL BIT CHUCK FOR MANUALLY OPERATED TOOLS

[75] Inventor: Josef Obermeier, Peiting, Germany

[73] Assignee: Hilti Aktiengesellschaft, Fürstentum, Liechtenstein

[21] Appl. No.: 353,574

[22] Filed: Dec. 9, 1994

[30] Foreign Application Priority Data

Dec. 9, 1993 [DE] Germany .......................... 43 41 969.0

[51] Int. Cl.[6] .............................. B23B 51/00; B23B 31/22

[52] U.S. Cl. .............................. 408/226; 279/19; 408/240

[58] Field of Search ................................ 408/226, 239 R, 408/239 A, 240; 279/19, 19.2, 19.3, 19.4, 19.5, 19.6, 75

[56] References Cited

U.S. PATENT DOCUMENTS 4,943,192 7/1990 Lafforgue et al. ........................ 279/19
5,397,203 3/1995 Kleine et al. .......................... 279/19.5

*Primary Examiner*—Daniel W. Howell
*Attorney, Agent, or Firm*—Anderson Kill Olick & Oshinsky

[57] ABSTRACT

A tool bit for insertion into a tool bit chuck in a manually operated tool used for chiseling and/or percussion drilling includes a chucking shank (6). The chucking shank has two rotary entrainment grooves (7) located diametrically opposite one another and open at the end of the chucking shank to be inserted into the chuck. A pair of locking grooves (8) are located diametrically opposite one another. Axially extending grooves (9) overlap at least part of the pair of locking grooves (8) so that end faces (8*a*) are formed extending transversely of the axial projection and facing away from the end of the chucking shank to be inserted into the chuck. While the axially extending grooves (9) afford improved transmission of the required torque, additional locking grooves (10) overlapping the rotary entrainment grooves (7) are provided for improving absorption of axial forces with the additional locking grooves (10) forming end faces (10*a*) directed away from the end of the chucking shank (6) to be inserted into the chuck.

8 Claims, 2 Drawing Sheets

TOOL BIT AND TOOL BIT CHUCK FOR MANUALLY OPERATED TOOLS

BACKGROUND OF THE INVENTION

The present invention is directed to a tool bit for insertion into a tool bit chuck in a manually operated tool used for chiseling and/or percussion drilling and includes an axially extending chucking shank with at least a locking groove closed at its ends extending transversely of the axial projection and at least two rotary entrainment grooves open at the end of the shank inserted into the chuck.

Tool bits for manually operated tools are disclosed in DE-PS 25 51 125 where the chucking shank of such tool bits has one or two locking grooves closed in the axial projection as well as one or two axially extending rotary entrainment grooves open at the end of the shank to be inserted into a chuck. The tool bit chuck into which the tool bit is inserted has one or two radially displaceable locking elements in the form of balls or rollers.

The locking elements cooperate with the locking grooves closed in the axial projection for retaining tool bits within the tool bit chuck. This retention in the axial projection secures a tool bit from falling out and, in addition, fixes the tool bit in the tool bit chuck in the axial projection in such a way that the tool bit can be pulled out of a bore or hole drilled in a structural member. Considerable loads are developed in the axial projection if a jammed tool bit must be pulled out of a bore in a structural member. Since such problems occur only occasionally, in the past little attention has been paid in the design of tool bits to providing an axially locked connection with the chuck.

The transmission of torque from the tool bit chuck is a more significant problem, especially in view of the trend to make manually operated tools more powerful and to use much larger diameter tool bits in such tools. Due to the trend of increasing the torque to be transmitted to the tool bit, wear of the chucking shank can lead to premature failure. Such failure, due to wear of the chucking shank of the tool bit, can take place long before the normal wear in the working region occurs under every day use of such tool bits. This premature failure of the tool bit has a significant effect on the economics of the tool bit.

Using larger rotary entrainment grooves for providing larger flanks for the transmission of torque fails due to the reduction in the cross-section of the chucking shank which results. The weakening of the tool bit due to the reduction in its cross-section leads to premature failure, for instance by fracture in the region of the chucking shank. A tool bit with a chucking shank designed in this disadvantageous manner is disclosed in EP-A-0 355 071.

SUMMARY OF THE INVENTION

Therefore, the primary object of present invention is to provide a tool bit capable of transmitting greater torque as well as absorbing larger axial forces in cooperation with a correspondingly designed tool bit chuck, without weakening the cross-section of the chucking shank.

In accordance with the present invention at least one axially extending groove is provided open toward the end of the chucking shank inserted into the chuck, and it is arranged so that the axially extending groove overlaps a locking groove whereby an end face of the locking groove is formed which faces away from the end of the chucking shank inserted into the chuck and by providing at least another locking groove closed at its ends spaced apart in the axial projection so that one of the rotary entrainment grooves and the additional locking groove overlap and form an end face directed away from the end of the chucking shank inserted into the chuck.

According to one embodiment of the tool bit incorporating the present invention, at least one axially extending groove, open at the end of the chucking shank inserted into the chuck, is available in addition to the rotary entrainment grooves also open at the end of the chucking shank for the transmission of torque. In this arrangement the axially extending groove is disposed so that it does not weaken the chucking shank of the tool bit and does not significantly reduce the surface of the chucking shank which serves for guidance. As a result, no penalty regarding the ability to guide the inventive tool bit has to be accepted, although the overall surface area serving for the transmission of torque is considerably increased. Due to the overlapping in the axial projection of a locking groove and the axially extending groove of the invention, an end face is formed directed away from the end of the chucking shank inserted into the chuck and results in the axial retention in cooperation with corresponding locking elements in the chucking shank. Due to the arrangement of at least one additional locking groove closed at its ends extending transversely of the axial projection and in overlapping relation with a rotary entrainment groove so that an additional end face directed away from the end of the clamping shank is formed whereby higher forces can be handled in the axial projection. This advantage is particularly significant if tool bits must be pulled out of the bore in a structural member after the bit has become jammed.

Preferably, at least the one axially extending groove is arranged so that it is unequally spaced in the circumferential direction from the adjacent rotary entrainment grooves. This arrangement affords an offset in the circumferential direction with respect to the existing locking groove, so that the surface of an end face directed away from the end of the chucking shank to be inserted into the chuck can be increased to an optimum.

In a preferred embodiment two axially extending grooves are provided overlapping in the axial projection with two locking grooves while forming end faces with locking grooves extending transversely of the axial projection and facing away from the end of the chuck. Such an arrangement affords an additional increase of the engagement surfaces important for the transmission of torque while avoiding any weakening of the cross-section of the chucking shank or sacrificing surfaces of the chucking shank needed for guiding the tool bit.

It is preferred to dispose the two axially extending grooves together with the locking grooves which overlap in the axial projection with the axially extending grooves so that they are located diametrically opposite one another. A uniform division of the forces generated are attained and manufacturing advantages are gained by this arrangement whereby it is possible to manufacture the tool bit without machining operations by using pressing devices located opposite one another, possibly extrusion devices.

Considered from a manufacturing viewpoint as well regarding compatibility with existing tool bit chucks presently commercially available, it is advantageous to arrange the additional locking groove symmetrically corresponding to the rotary entrainment grooves.

In a preferred arrangement, two additional locking grooves are provided each overlapping in the axial projection a rotary entrainment groove and forming additional end faces directed away from the end of the chucking shank inserted into the chuck. Apart from the advantages mentioned above concerning manufacturing and compatibility, a symmetrical distribution is achieved considering the aspect of torque as well as the aspect of axially occurring forces. This effect is gained particularly if the two additional locking grooves are arranged diametrically opposite one another.

A tool bit shaped in the above manner has the advantage of being usable in a conventional tool bit chuck, such as the one disclosed in DE-PS 25 51 125. Further, it can be used in other commercially available tool bit chucks, such as chucks which have two locking elements located opposite one another or one locking element and one entrainment strip located diametrically opposite one another. In these various applications,that is when using the inventive tool bit in such known tool bit chucks, the advantages of the invention are not completely achieved.

The advantages of the present invention, that is the ability to increase the torque to be transmitted as well as increasing the absorption of axially directed forces can be fully obtained if the tool bit is inserted into a tool bit chuck with a receiving opening including at least one radially displaceable locking element cooperating with the locking grooves closed in the axial projection, at least one additional radially displaceable locking element cooperating with the additional axially closed locking groove, at least two entrainment strips cooperating with the rotary entrainment grooves open at the end of the chucking shank as well as at least one axially extending strip cooperating with the axially extending groove open at the end of the chucking shank.

One or two locking elements, one or two additional locking elements as well as one or two axially extending strips can be used in a preferred manner.

The various features of novelty which characterize the invention are pointed out with particularity in the claims annexed to and forming a part of this disclosure. For a better understanding of the invention, its operating advantages attained by its use, reference should be had to the drawing and descriptive matter in which there are illustrated and described preferred embodiments of the invention.

DETAILED DESCRIPTION OF THE INVENTION

Figure 1:
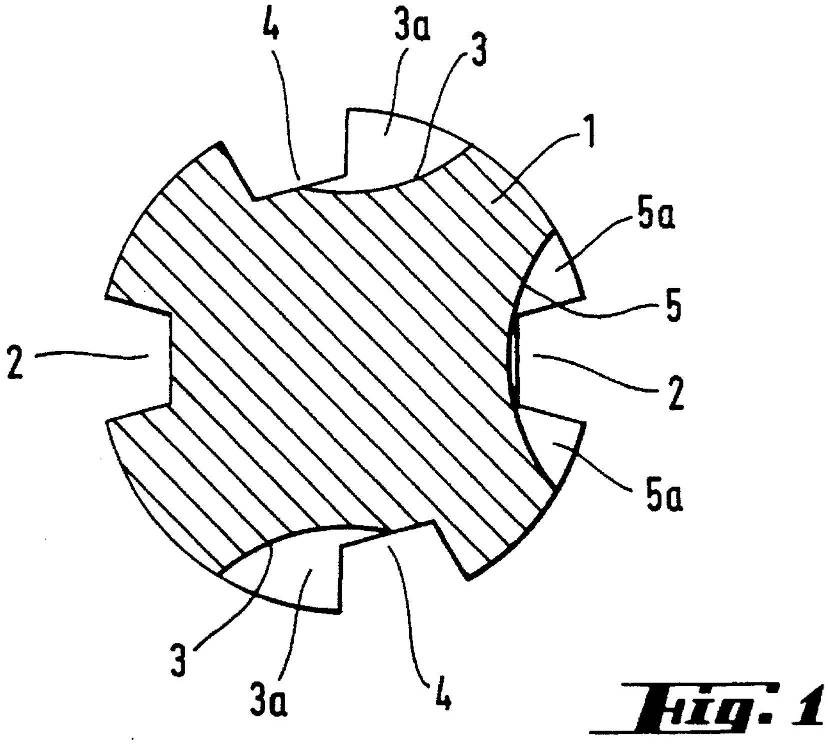
FIG. 1 is a transverse cross-sectional view of a chucking shank of a tool bit embodying the present invention.

In FIG. 1 a tool bit is shown having an axially extending chucking shank 1 with two axially extending rotary entrainment grooves 2 each open toward the end of the chucking shank 1 to be inserted into a chuck with the rotary entrainment grooves arranged diametrically opposite one another and two locking grooves 3 closed at the ends extending transversely of the axial projection and positioned diametrically opposite one another. Axially extending grooves 4 extend axially through the locking grooves 3 with the axially extending grooves 4 traversing only a part of the locking grooves 3 so that end faces **3*a* are formed in the locking grooves directed away from the end of the chucking shank to be inserted into the chuck. In addition, another locking groove 5 closed transversely of the axial projection is arranged in the region of one of the rotary entrainment grooves 2 with the rotary entrainment groove 2 overlapping a part of the locking groove 5 so that an end face 5*a* extending transversely of the axial projection is arranged facing away from the end of the chucking shank to be inserted into the chuck. The entrainment groove 2 and the locking groove 5 are arranged symmetrically so that the end face 5*a*** is divided into two parts substantially equal to one another.

Figure 2:
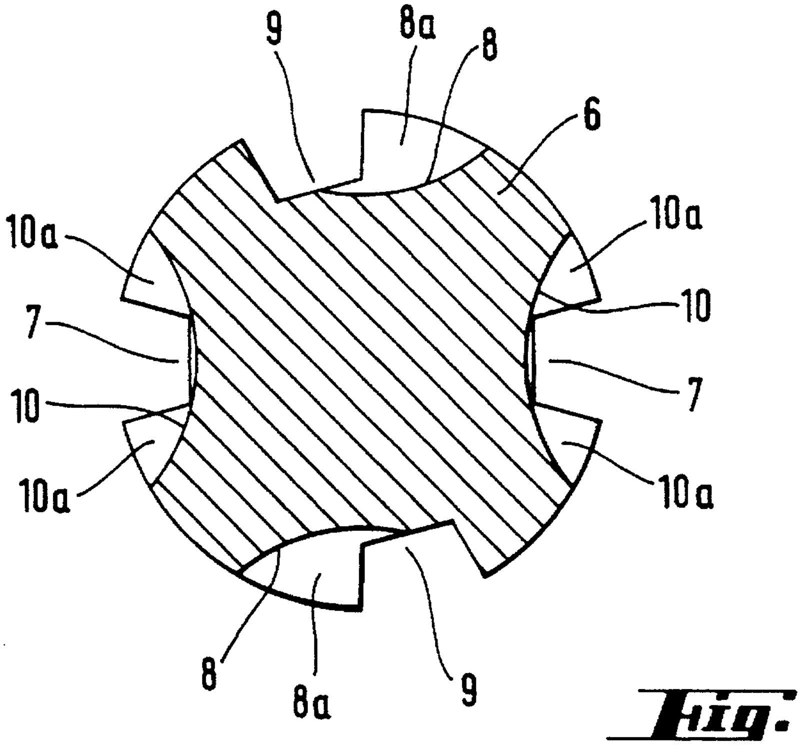
FIG. 2 is a transverse cross-sectional view through a chucking shank of another tool bit embodying the present invention.

In FIG. 2 another axially extending chucking shank 6 is displayed provided with two axially extending rotary entrainment grooves 7 open at the end of the chucking shank to be inserted into a chuck with the rotary entrainment grooves located diametrically opposite one another and with two locking grooves 8 closed transversely of the axial projection and also disposed diametrically opposite one another. Axially extending grooves 9 extend through locking grooves 8 so that end faces **8*a* are formed facing away from the end of the chucking shank 6 to be inserted into the chuck. Two rotary entrainment grooves 7 overlap or extend through two additional locking grooves 10 so that additional end faces 10*a* directed away from the end of the chucking shank 6 to be inserted into the chuck are formed. The rotary entrainment grooves 7 are arranged symmetrically with respect to the additional locking grooves 10 whereby the two end faces 10*a*** are divided into two substantially equal partial faces.

Figure 3:
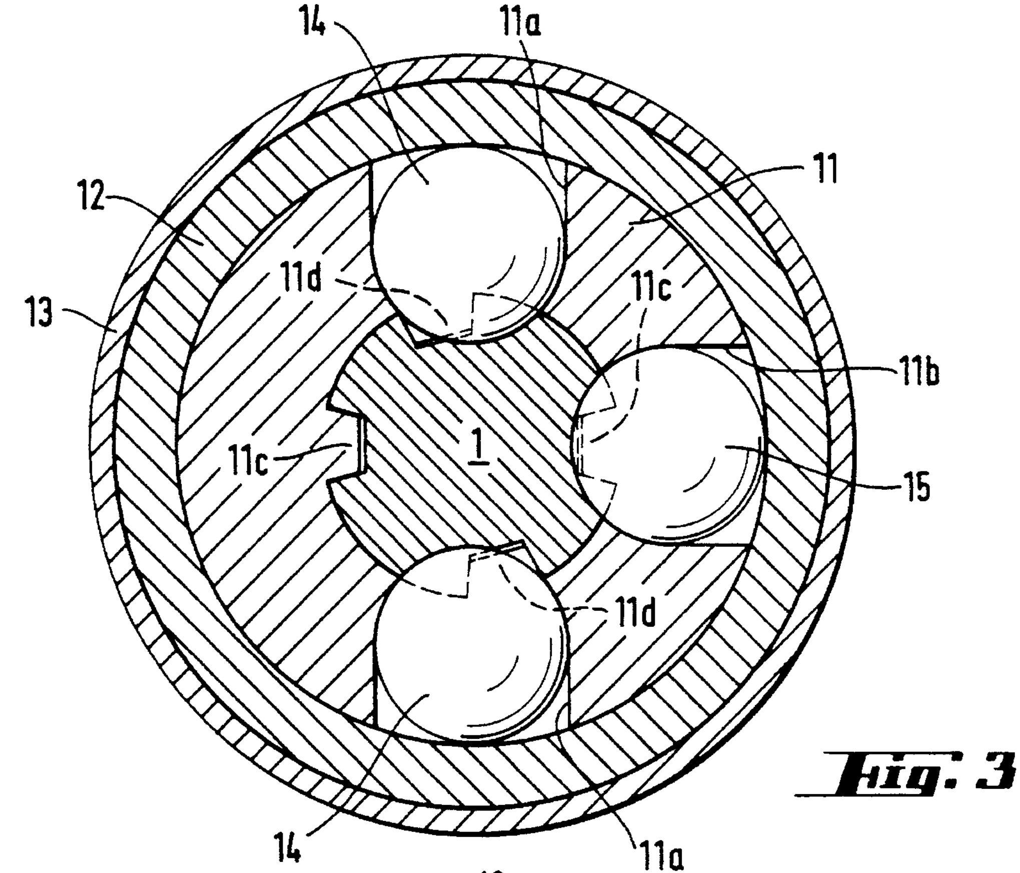
FIG. 3 is a transverse cross-sectional view through a simplified arrangement of a tool bit chuck with the chucking shank of the tool bit illustrated in FIG. 1 inserted into the chuck.

In FIG. 3 a simplified arrangement of a tool bit chuck is shown formed of an annular guide 11 encircled by an annular actuation sleeve 12 with an annular cage 13 encircling the actuation sleeve. By way of example, two locking elements 14 located opposite one another are mounted radially displaceable in openings **11*a* in the guide 11. Further by way of example, an additional locking element 15 is provided radially displaceable in another opening 11*b* in the guide 11. In addition, guide 11 has two axially extending entrainment strips 11*c* located diametrically opposite one another and two axially extending strips 11*d*** also disposed diametrically opposite one another.

Figure 4:
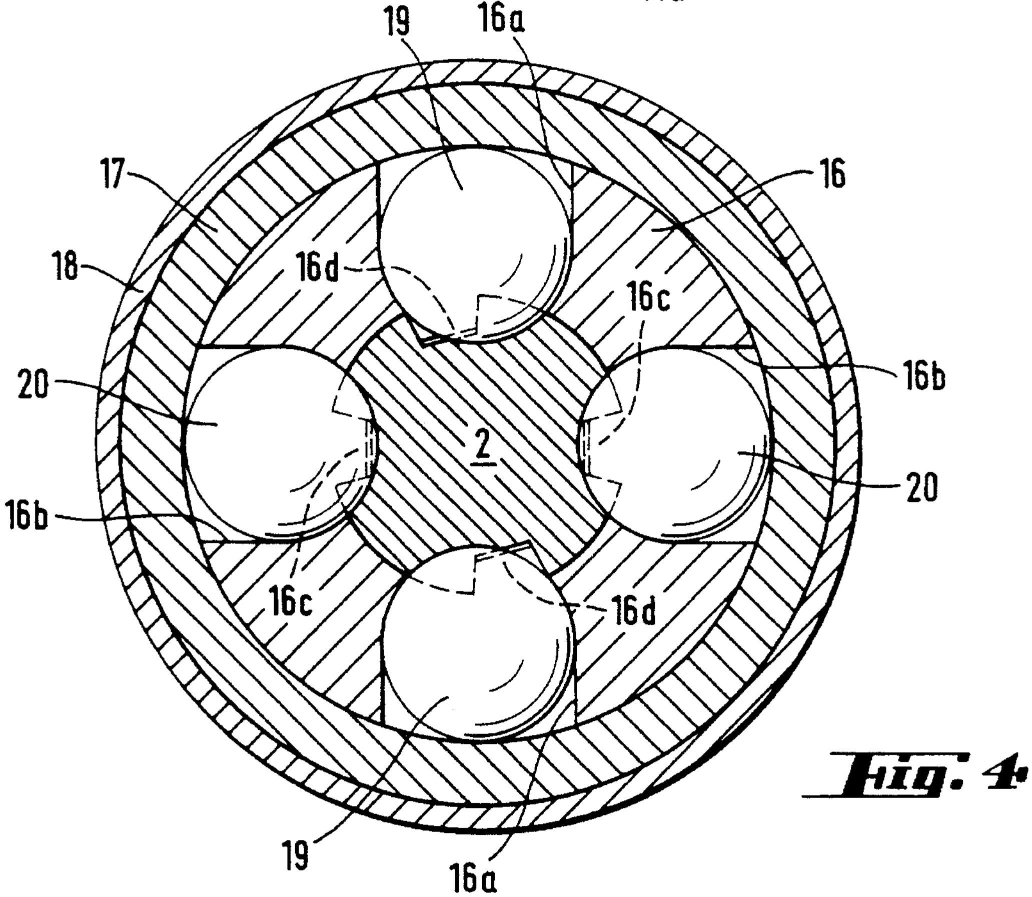
FIG. 4 is a transverse sectional view of a simplified arrangement of a tool bit chuck with the chucking shank of the tool bit shown in FIG. 2 inserted into the chuck.

In FIG. 4 the illustrated tool bit chuck also includes an annular guide 16, an annular locking sleeve 17 enclosing the guide and an annular cage 18 encircling the locking sleeve. Two locking elements 19 in the form of balls are radially displaceably mounted in openings **16*a* in the guide 16 located opposite one another. Further, two additional locking elements 20 also in the shape of balls are mounted to be radially displaceable in openings 16*b* of the guide 16. In addition, guide 16 has two axially extending entrainment strips 16*c* located diametrically opposite one another and two additional axially extending strips 16*d* also located diametrically opposite one another so that these strips afford transmission of torque. In the tool bit chuck shown in FIG. 3 as well as the chuck shown in FIG. 4, the locking elements 14, 19 and the additional locking elements 15, 20 are located in the region of the axially extending entrainment strip 11*c*, 16*c* and the axially extending strips 11*c*, 16*c*. The blocking elements 14, 19 and the additional locking elements 15, 20** are balls, only a small axially extending section of the entrainment strips 11*c*, 16*c* and of the axially extending strips 11*c*, 16*c* are involved, so that the presence of the locking elements in the region of the strip cannot limit the guidance of the tool bit nor is there a significant reduction in the transmission of torque.

While specific embodiments of the invention have been shown and described in detail to illustrate the inventive principles, it will be understood that the invention may be embodied otherwise without departing from such principles.

I claim:

1. Tool bit for insertion into a tool bit chuck in a manually operated tool used for at least one of chiseling and percussion drilling, said tool bit comprising an axially extending chucking shank (1, 6) with an axially extending outside surface and a first end for insertion into the tool bit chuck, said shank having at least one locking groove (3, 8) in the outside surface thereof closed at ends thereof extending transversely of the axial projection and at least two axially extending rotary entrainment grooves (2, 7) in the outside surface thereof and open at the first end thereof, wherein the improvement comprises at least one axially extending groove (4, 9) open at the first end of said chucking shank (1, 6), said axially extending groove (4, 9) and said locking groove (3, 8) overlap at least in part in the axial projection with said locking groove forming an end face (3*a*, 8*a*) extending transversely of the axial projection and directed away from said first end of said chucking shank, and at least an additional locking groove (5, 10) in the outside surfaces of said chucking shank overlapping in the axial projection one of said rotary entrainment grooves (2, 7) and said additional locking grooves (5, 10) forming an end face (5*a*, 10*a*) extending transversely of the axial projection and facing away from said first end of said chucking shank.

2. Tool bit, as set forth in claim 1, wherein said axially extending groove (4, 9) is located in the outside surface unequally spaced in the circumferential direction with respect to said rotary entrainment grooves (2, 7).

3. Tool bit, as set forth in claim 1 or 2, wherein two said axially extending grooves (4, 9) are provided each of which overlaps in the axial projection one of two said locking grooves (3, 8) with each of said locking grooves forming end faces (3*a*, 8*a*) directed away from the first end of said chucking shank (1, 6).

4. Tool bit, as set forth in claim 3, wherein said two axially extending grooves overlapping said locking grooves (3, 8) are each arranged substantially diametrically opposite one another.

5. Tool bit, as set forth in claim 4, wherein said additional locking groove (5, 10) is symmetrical with respect to said rotary entrainment groove (2, 7) with which it is in overlapping relation.

6. Tool bit, as set forth in claim 5, wherein two said additional locking grooves (10) are located on opposite sides of said chucking shank (1, 6) and each is in overlapping relation with one of said rotary entrainment grooves (7) and each said additional locking groove (10) forms an end face extending transversely of the axial projection and facing away from the first end of said chucking shank (6).

7. Tool bit, as set forth in claim 6, wherein said additional locking grooves (10) are disposed diametrically opposite one another.

8. Tool bit chuck with a receiving opening for a tool bit as set forth in claim 1 or 2, wherein said tool bit chuck has at least one radially displaceable locking element (14, 19) cooperating with one of said locking grooves (3, 8), at least one radially displaceably additional locking element (15, 20) cooperating with at least one of said additional locking grooves (5, 10), at least two rotary entrainment strips (11*c*, 16*c*) cooperating with said rotary entrainment grooves (2, 7), and at least one additional axially extending strip (11*d*, 16*d*) cooperating with at at least one of said additional axially extending grooves (4, 9) in said chucking shank (1, 6).

* * * * *